(12) United States Patent
Spillman, III et al.

(10) Patent No.: US 7,215,742 B1
(45) Date of Patent: May 8, 2007

(54) TROUBLESHOOTING INTERFACE FOR CLIENT-ROUTED TOLL-FREE TELEPHONE CALLS

(75) Inventors: Roy Robert Spillman, III, Lee's Summit, MO (US); Brian Patrick Hulett, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 455 days.

(21) Appl. No.: 10/452,897

(22) Filed: Jun. 2, 2003

(51) Int. Cl.
*H04M 1/34* (2006.01)
*H04M 3/08* (2006.01)
*H04M 3/22* (2006.01)

(52) U.S. Cl. .................. 379/15.04; 379/1.01; 379/14; 379/29.01

(58) Field of Classification Search ............. 379/29.01, 379/29.02, 29.1, 265.09, 265.01, 1.01, 9, 379/9.04, 14, 15.02, 15.04, 32.01
See application file for complete search history.

(56) References Cited

U.S. PATENT DOCUMENTS

| | | | | |
|---|---|---|---|---|
| 5,521,958 A | * | 5/1996 | Selig et al. .................... 379/21 |
| 5,533,093 A | * | 7/1996 | Horton et al. ................. 379/21 |
| 5,696,809 A | * | 12/1997 | Voit ......................... 379/22.01 |
| 5,703,940 A | * | 12/1997 | Sattar et al. ............ 379/201.05 |
| 5,867,558 A | * | 2/1999 | Swanson .................... 379/9.03 |
| 6,145,096 A | * | 11/2000 | Bereiter et al. ............... 714/25 |
| 6,272,115 B1 | * | 8/2001 | Elliott, III ................... 370/259 |
| 6,292,909 B1 | * | 9/2001 | Hare ........................... 714/40 |
| 6,539,538 B1 | * | 3/2003 | Brewster et al. ............ 717/115 |
| 6,891,929 B2 | * | 5/2005 | Yang et al. ............... 379/29.01 |
| 7,027,405 B1 | * | 4/2006 | Khadavi ..................... 370/244 |

\* cited by examiner

*Primary Examiner*—Binh K. Tieu

(57) ABSTRACT

A remote processor (RP) adapted for use with a telephone system is provided according to one embodiment of the invention. The RP includes a communication interface capable of communicating with a service control point (SCP) of the telephone system and a processing system. The processing system is configured to present a troubleshooting graphical interface and present one or more troubleshooting tools to be used in troubleshooting RP operations and in troubleshooting RP interactions with the telephone system.

20 Claims, 7 Drawing Sheets

TROUBLESHOOTING INTERFACE FOR CLIENT-ROUTED TOLL-FREE TELEPHONE CALLS

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to a troubleshooting interface for client-routed toll free telephone calls in a telephone communication system.

2. Description of the Prior Art

Modern telephone communications systems commonly offer a toll-free call service. In a toll-free telephone call, the call recipient pays for the call, and not the caller. Toll-free call services are therefore widely used by businesses in order to encourage calls from customers and potential customers.

Another popular use for toll-free calls are customer service functions, wherein customers can use a toll-free number to obtain information, register complaints, apply for services, make purchases, etc. A large toll-free service client may possess multiple toll-free call centers, and may desire the capability to route incoming toll-free calls to specific call center locations. This may include routing such traffic in order to manage traffic flow and keep a call center from being overloaded. This may also include routing to avoid traffic problems due to transient conditions, such as telephone network problems, differences in hours between locations, to handle special events such as sales promotions, to accommodate service downtime requirements, etc.

Toll-free calls are typically routed by a service control point (SCP). The SCP is in communication with a telephone communication network and a remote processor (RP). The RP provides routing information to the SCP, including real-time routing information and routing changes. When routing is to be changed, routing data stored in the RP may be modified in order to affect the change. In operation, the SCP receives a called telephone number (i.e., a 1-800 telephone number), determines the destination using the RP (the destination is not specified by the dialed telephone number in a 1-800 call), and determines the routing of the telephone call through the telephone lines and switches of the telephone communications system.

A prior art approach to routing has been to allow toll-free service clients to route their own incoming traffic. This allows the client to be responsive to traffic, local conditions, network problems, etc. The routing control extends limited client access to the RP. The RP therefore can be employed by a toll-free service client to set routing conditions as desired. However, the toll-free service client is generally given only limited access to the remote processor, and is generally not allowed to perform operations that affect the system as a whole (as opposed to affecting just the client's routing operations), or are complex, such as troubleshooting problems that occur during routing of a toll-free call.

Although employees of a toll-free service client may be able to specify message routing, another important area is troubleshooting and fixing problems that may occur in routing. When an operational routing problem occurs, the toll-free service client according to the prior art may have to call a customer service department, wade through an automated telephone menu and/or wait in a voice queue, explain the problem to a customer service representative, and wait for the customer service representative to identify and fix the problem. This process is slow and frustrating to the client, and further incurs cost to the client due to lost time. Another drawback of this prior art approach is that many problems in computerized systems can be solved by a small set of simple troubleshooting processes, without any need for elaborate diagnostics or elaborate solutions. For example, cycling power to a computerized device will usually reset internal values and eliminate an operational problem. This drawback is compounded in that the customer service representative is not only generally busy and not immediately available, but if required to fix elementary problems, the customer service representative therefore has less time to spend on truly serious problems where the customer service representative is most needed.

SUMMARY OF THE INVENTION

The invention helps solve the above problems by providing a troubleshooting capability for toll-free call routing. A remote processor (RP) adapted for use with a telephone system is provided according to one embodiment of the invention. The RP includes a communication interface capable of communicating with a service control point (SCP) of the telephone system and a processing system. The processing system is configured to present a troubleshooting graphical interface and present one or more troubleshooting tools to be used in troubleshooting RP operations and in troubleshooting RP interactions with the telephone system.

BRIEF DESCRIPTION OF THE DRAWINGS

The same reference number represents the same element on all drawings.

DETAILED DESCRIPTION OF THE PREFERRED EMBODIMENT

FIGS. 1–7 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
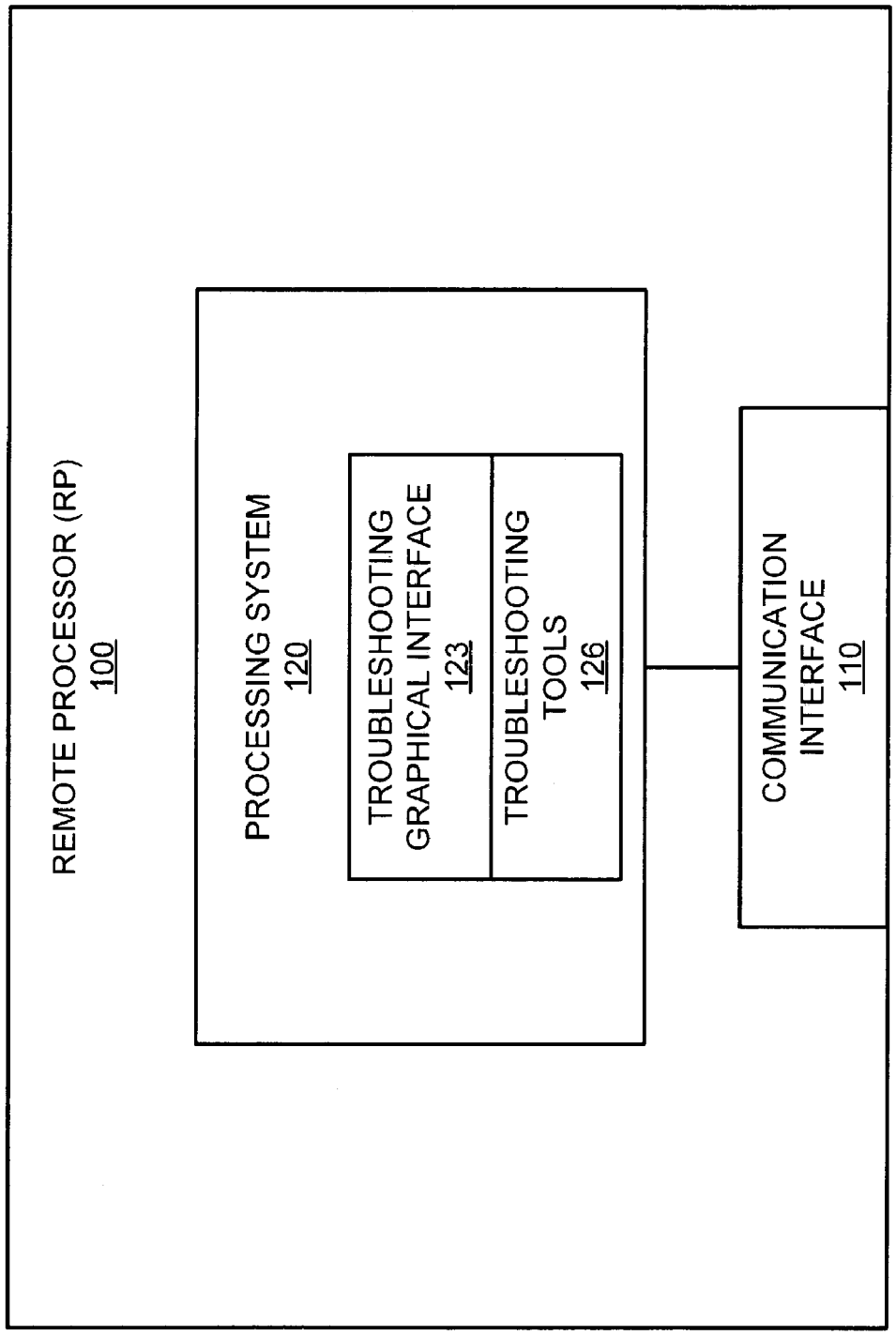
FIG. 1 illustrates a remote processor (RP) according to one example of the invention.

FIG. 1 illustrates a remote processor (RP) 100 according to one example of the invention. The RP 100 is capable of performing toll-free call routing within a communication network (see FIGS. 3 and 4). In addition, the RP 100 may be used to troubleshoot routing operations according to the invention, and may present a graphical troubleshooting interface to users. A user in one example is a toll-free service client. For example, a user is an employee of a corporation or other institution that operates and is responsible for proper operation of a toll-free telephone service.

The RP 100 includes a communication interface 110 and a processing system 120 connected to the communication interface 110. The processing system 120 presents a troubleshooting graphical interface 123 and one or more troubleshooting tools 126 to a user. The RP 100 therefore includes a troubleshooting interface and may be employed by a user to troubleshoot a call routing operation, to troubleshoot an RP device, or troubleshoot other devices or operations of a communication system.

The communications interface 110 performs communications between the RP 100 and other devices of a communication network. For example, the communications interface 110 may perform communications between the RP 100 and a service control point (SCP) of a telephone communication network (see FIGS. 3 and 4). The communication interface 110 may be a telephone modem, a wireless modem or other wireless transceiver, a computer network card, an optical transceiver, a specialized communication device, etc.

The processing system 120 executes a control routine. The control routine may comprise an application program, firmware, or some other form of machine-readable processing instructions. When executed by the processing system 120, the control routine directs the processing system 120 to receive inputs and to conduct operations of the RP 100, including conducting communications with other communication devices and receiving user inputs from the user interface 150. In addition, the control routine directs the processing system 120 to operate in accordance with the invention.

The processing system 120 may be a general purpose processor. The processing system 120 may comprise a programmed general purpose computer or a microprocessor. Alternatively, the processing system 120 may comprise a logic circuit or other programmable or special purpose circuitry and equipment.

Figure 2:
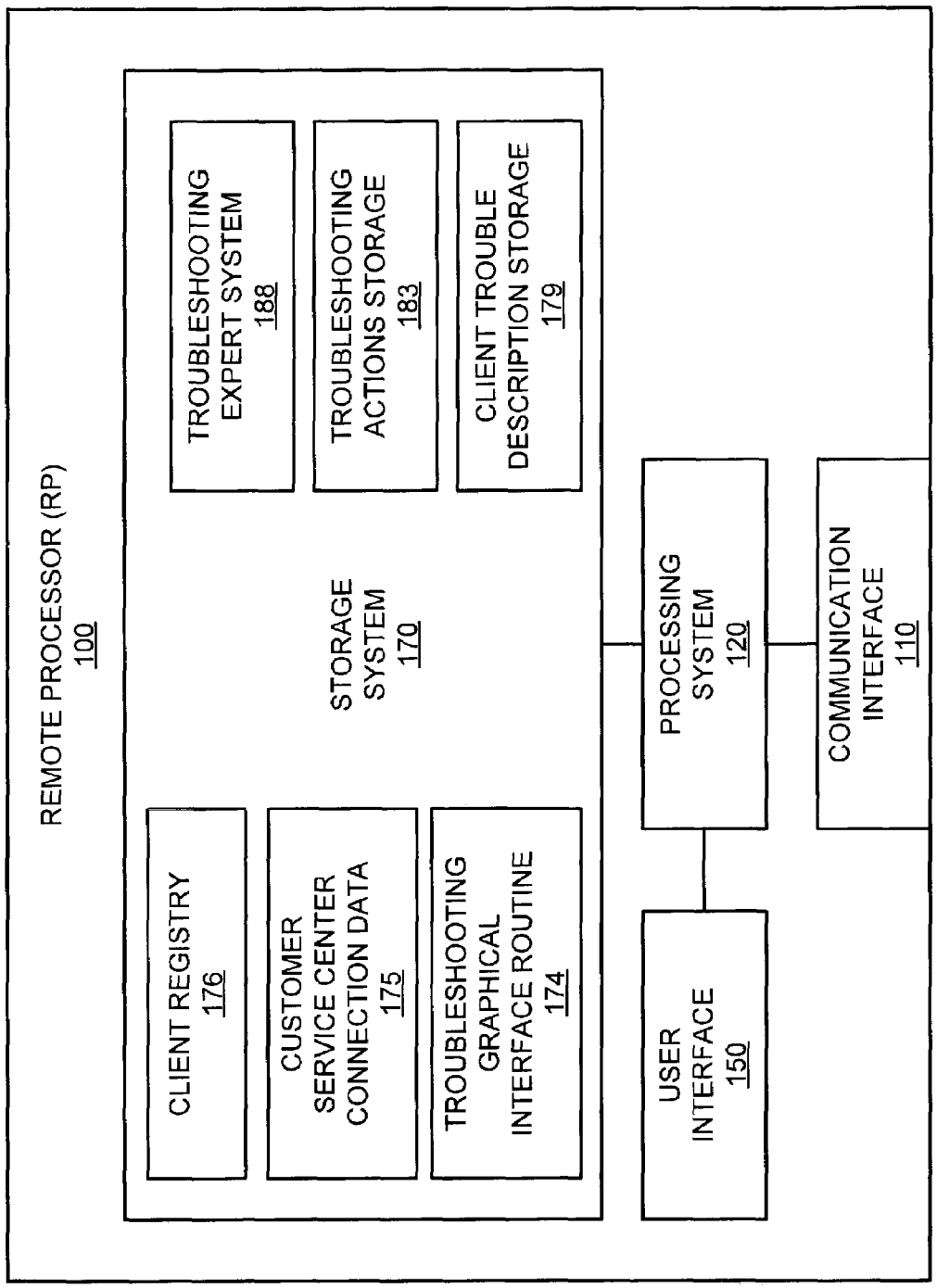
FIG. 2 illustrates the RP according to another example of the invention.

FIG. 2 illustrates the RP 100 according to another example of the invention. The RP 100 may include, in addition to the previously recited components, a user interface 150 and a storage system 170. The processing system 120 is linked to the communication interface 110, to the user interface 150, and to the storage system 170.

The user interface 150 accepts user inputs and may further generate outputs and displays to the user. The user interface 150 may include a computer monitor, a touchscreen, a keyboard, a mouse or other pointing device, a menu, a voice recognition interface, etc., and combinations thereof. It should be understood that although the user interface 150 is depicted as a component of the RP 100, the user interface 150 may alternatively be remotely located and may be in communication with the processing system 120.

The storage system 170 comprises digital memory and may be a disk, tape, integrated circuit, server, or other memory device. In addition, the storage system 170 may be distributed among multiple memory devices. The storage system 170 may store, among other things, a troubleshooting graphical interface routine 174, a customer service center connection data 175, a client registry 176, a client trouble description storage 179, a troubleshooting actions storage 183, and a troubleshooting expert system 188. In addition, the storage system 170 may store a control routine to be executed by the processing system 120.

The troubleshooting graphical interface routine 174 generates the graphical troubleshooting interface 123 that is presented and displayed to the user. The graphical troubleshooting interface 123 generates graphical displays that can be manipulated to activate a corresponding troubleshooting tool or action. By employing the troubleshooting graphical interface 123, the user can visually review and select from among the troubleshooting tools 126 and therefore from among the corresponding troubleshooting actions. The user can use a troubleshooting tool 126 by selecting a displayed button, menu, checkbox, etc.

The customer service center connection data 175 includes communication data that enables a connection between the RP 100 and an appropriate customer service center. The customer service center connection data 175 therefore may include a telephone number and other connection data. Alternatively, the customer service center connection data 175 may include an Internet protocol (IP) address, a web address, etc. The customer service center connection data 175 may further include a graphical interface, such as a button, menu item, checkbox, etc., that allows the user to graphically initiate the connection by merely selecting the graphical interface input item. After such selection, in one example the connection to the customer service center is automatically established by the troubleshooting graphical interface routine 174.

The client registry 176 is an optional feature. The client registry 176 is a storage of users that are authorized to access the troubleshooting graphical interface routine 174.

The client trouble description storage 179 is an optional storage of trouble descriptions entered by the user. The data within the client trouble description storage 179 may be read or otherwise accessed by a customer service center if the user escalates the troubleshooting session to a customer service representative. The user may enter data here directly, including through buttons, menus, checkboxes, etc., or may simply type in a problem description.

The troubleshooting actions storage 183 stores the one or more troubleshooting tools 126. The troubleshooting tools 126 correspond to troubleshooting actions that the user can select and employ. The troubleshooting actions storage 183 may include diagnostic troubleshooting tools and corrective troubleshooting tools. The tools include, but are not limited to, tools for: selecting network components or processes, checking network connectivity, rebooting components of the RP 100 (i.e., rebooting a communication interface 110, rebooting the processing system 120, rebooting other components of an associated communication network, etc.), cycling power to components, displaying the telecommunications processes executing on a particular component of the RP 100, starting/stopping processes executing on a particular component of the RP 100, resetting a protocol card, pinging a component of the communication network (i.e., bouncing a packet off of another Internet protocol device and listening for a reply in order to confirm network connectivity and network loading, among other things), checking and/or displaying the status of a process (i.e., active, inactive, idle, etc.), obtaining the up-time of a process, performing trace routing, etc. The tools allow the selection of a component or process by name, function, address, etc. The tools can store results for later analysis, output, downloading, etc. The above listing is not exhaustive, and may include additional actions.

The troubleshooting expert system 188 guides the user through a troubleshooting session and aids in diagnosing and solving problems. For example, the troubleshooting expert system 188 may request starting data, such as by requesting that the user select applicable symptoms from among a group of presented symptoms. The selection may be through selection of graphically presented buttons, menus, checkboxes, etc. Optionally, the troubleshooting expert system 188 may use the entered symptoms to further present other symptoms, such as more narrowly focused subset of symptoms. When the troubleshooting expert system 188 has enough data, the troubleshooting expert system 188 may then present one or more suggested tools and actions to the user. Therefore, when the user selects a symptom or set of symptoms, the troubleshooting expert system 188 may present suggested diagnostic and/or corrective actions (see FIG. 5 and accompanying discussion). This aspect of the RP 100 guides the user in basic troubleshooting, and therefore the user does not need specialized knowledge or training and does not need to understand the operation of the RP 100.

Figure 3:
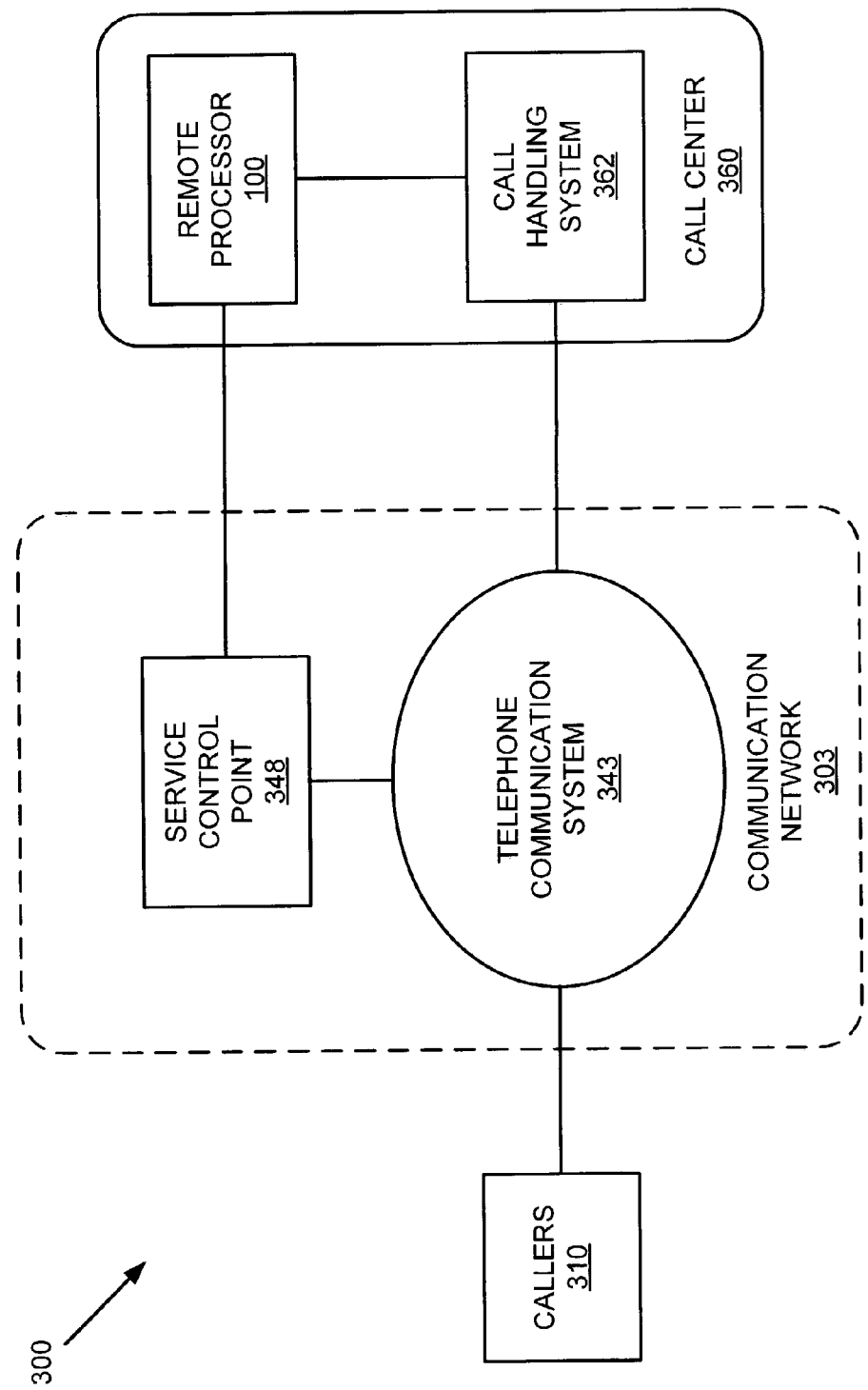
FIG. 3 shows a telephone system according to another example of the invention.

FIG. 3 shows a telephone system 300 according to another example of the invention. The telephone system 300 in this example includes a plurality of callers 310, a communication network 303, and a call center 360. The communication network 303 in this example includes a telephone communication system 343 and a service control point (SCP) 348. The telephone communication system 343 comprises the lines and switches that physically connect a calling telephone device to an answering telephone device. The SCP 348 conducts routing operations and therefore controls switching operations within the communication network 303. The communication network 303 may receive and complete incoming calls from the callers 310, including toll-free telephone calls.

The call center 360 may comprise a toll-free call center designed to receive incoming toll-free calls from the callers 310 (i.e., 1-800 telephone calls). To this end, the call center 360 may include a call handling system 362 and the RP 100. The call handling system 362 is any device, group of devices, or systems configured to receive and handle incoming toll-free calls, and may include automated equipment and/or human operators. The RP 100 stores routing information and therefore controls the routing of incoming toll-free telephone calls. Consequently, the RP 100 communicates routing information to the SCP 348. Therefore, through the RP 100, the toll-free service client can control routing of toll-free calls.

In addition to the operational capabilities discussed above, the RP 100 according to the invention includes the graphical troubleshooting interface 123 and the troubleshooting tools 126, as previously discussed. According to the invention, the user can perform troubleshooting operations and therefore can conduct operations with more efficiency and with a minimum of downtime and routing delays. Moreover, the automated troubleshooting of the RP 100 according to the invention allows call center personnel (i.e., troubleshooting technicians/users of the RP 100) to perform troubleshooting without needing extra training, and in much less time than would be required if going through a customer service center. Furthermore, the RP 100 according to the invention includes a graphical customer service connection input, wherein the call center personnel can easily and quickly connect to a customer service center if the problem cannot be addressed by the call center personnel.

Figure 4:
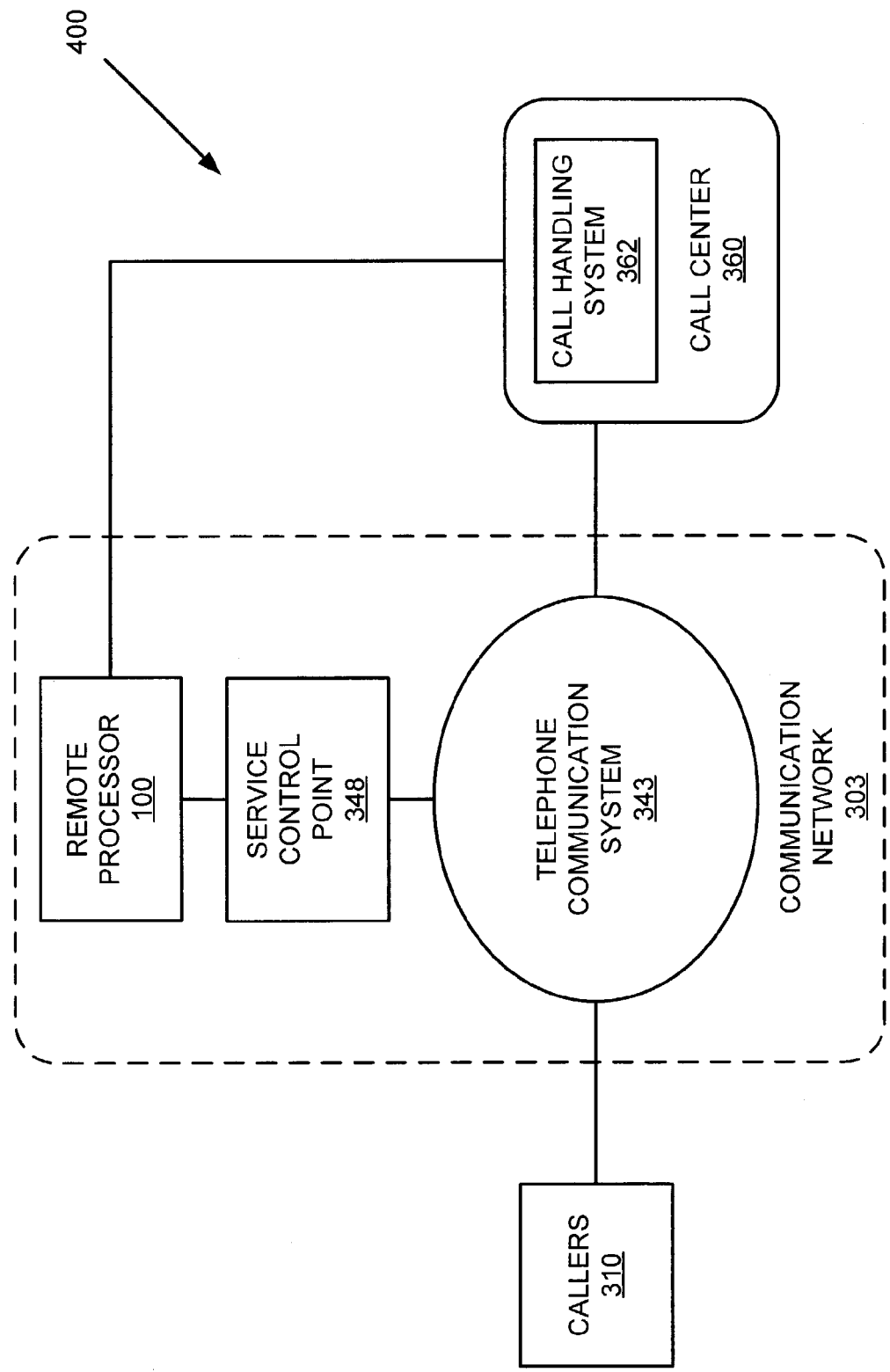
FIG. 4 shows a telephone system according to yet another example of the invention.

FIG. 4 shows a telephone system 400 according to yet another example of the invention. In the telephone system 400, the RP 100 is not a component of the call center 360, but is remote from and is accessed by the call center 360. For example, the call center 360 may communicate with the RP 100 via a telephone line connection, a digital computer network, a wireless network, etc.

Figure 5:
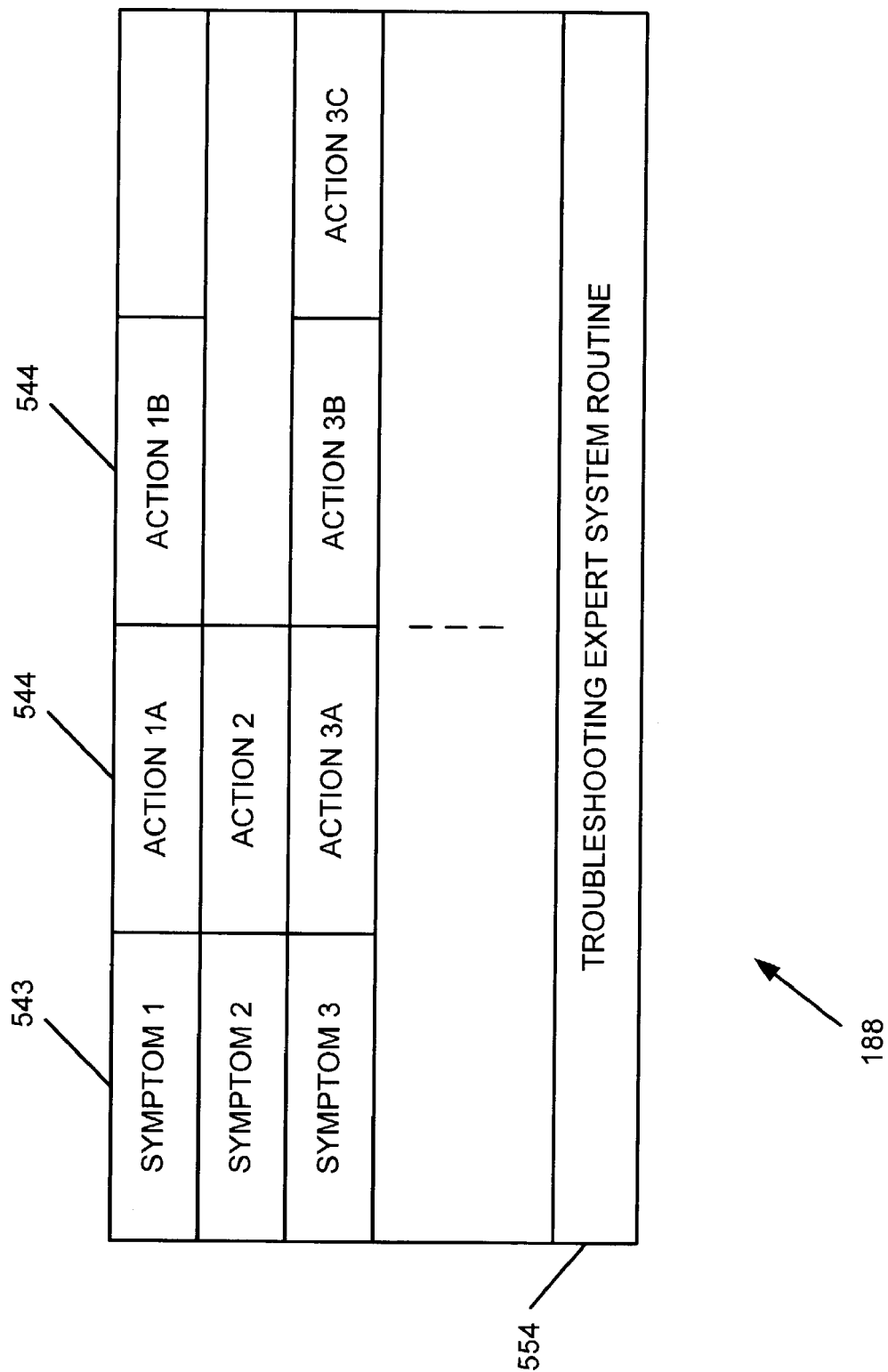
FIG. 5 illustrates a troubleshooting expert system according to yet another example of the invention.

FIG. 5 illustrates a troubleshooting expert system 188 according to yet another example of the invention. The troubleshooting expert system 188 includes a troubleshooting expert system routine 554 and a data structure that translates one or more symptoms into suggested troubleshooting actions. The troubleshooting expert system routine 554 presents a listing of stored symptoms to the user, receives symptom entries generated by the user (such as through buttons, menu items, checkboxes, etc.), and looks up and presents appropriate actions to the user. The troubleshooting expert system routine 554 translates symptoms entered by the user into suggested actions. The troubleshooting expert system 188 in one example is implemented in a storage system, such as a database, for example.

The data structure portion of the troubleshooting expert system 188 may include a symptom storage 543 and an action storage 544. A symptom storage entry 543 may store a listing of common symptoms (or error messages). The troubleshooting expert system 188 may include one or more action entries 544 for each symptom entry 543. The one or more action entries 544 present suggested actions to address the indicated symptom. For example, if the user is receiving error messages, the suggested action may be to perform a network connectivity test. Multiple symptoms may be input by the user and multiple actions may be suggested by the troubleshooting expert system 188.

Figure 6:
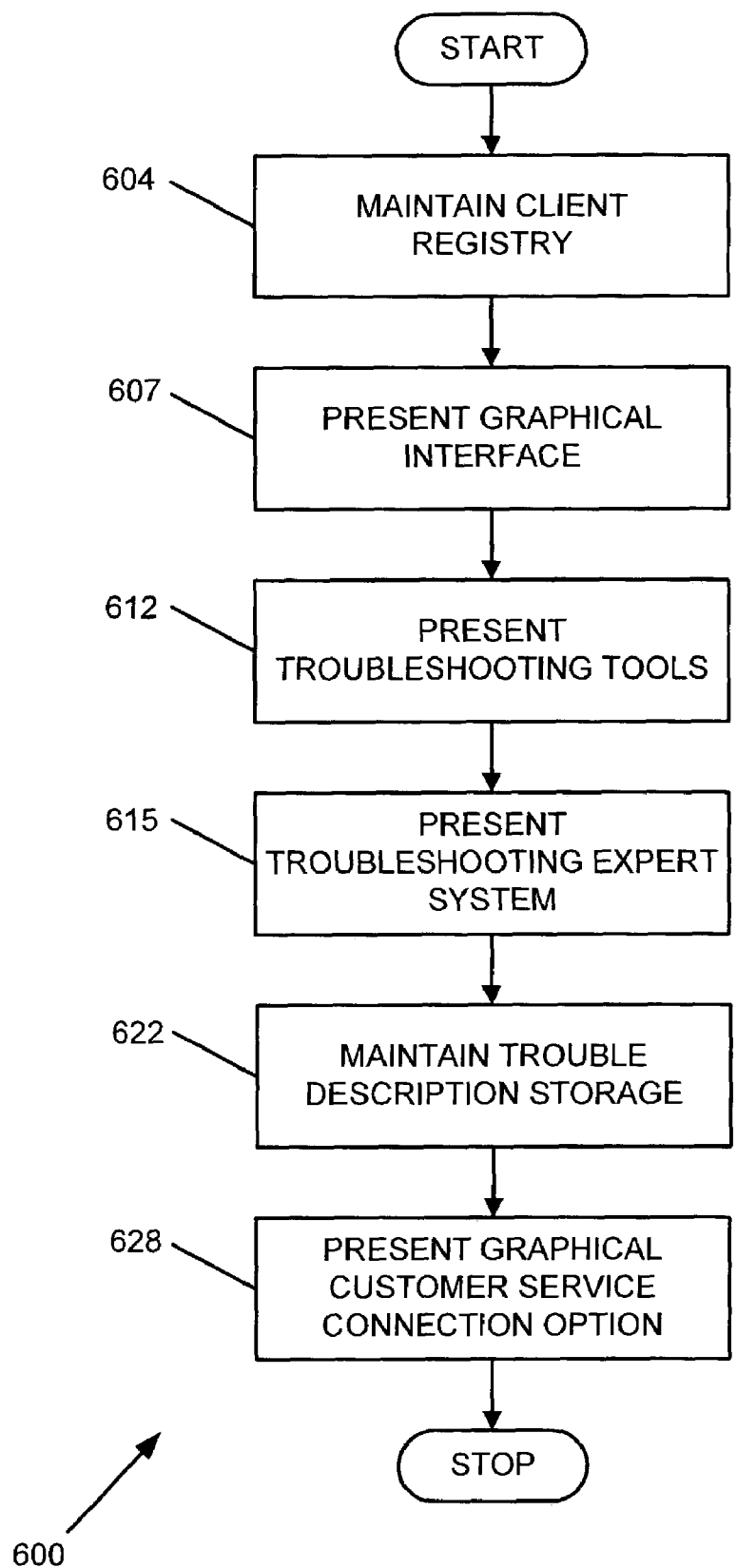
FIG. 6 is a flowchart of an example of a client troubleshooting method in an RP according to the invention.

FIG. 6 is a flowchart 600 of an example of a client troubleshooting method in an RP 100 according to the invention. In step 604, the RP 100 maintains a client registry of users that are authorized to access the troubleshooting graphical interface according to the invention.

In step 607, the RP 100 presents a troubleshooting graphical interface 123 to the user. The troubleshooting graphical interface 123 allows an unsophisticated and untrained user to perform troubleshooting operations. The graphical interface is simple and easy to use. No special commands or command-line operators need to be known or remembered by the user. The user may select troubleshooting actions merely by selecting a portion or portions of the displayed graphical interface.

In step 612, the RP 100 presents troubleshooting tools 126 to the user. The troubleshooting tools 126 may include common diagnostic and/or corrective actions, such as cycling power to or triggering a reset for a particular component. The troubleshooting tools 126 may be graphically presented to the user and may be graphically selected by the user.

In step 615, the RP 100 presents a troubleshooting expert system 188 to the user. The troubleshooting expert system 188 comprises a stored set of rules and actions that guide the user in troubleshooting.

In step 622, the RP 100 maintains a client trouble description storage 179 that stores user-entered problem descriptions. The problem descriptions may be accessed by a customer service representative and used for troubleshooting purposes. In one example, the problem descriptions are automatically presented by the RP 100 to the customer service representative when the RP 100 connects to the customer service representative using the customer service center connection data 175 (see FIG. 2).

In step 628, the RP 100 presents a customer service connection option to the user. If the user cannot solve a problem using the troubleshooting graphical interface 123, the user can employ the customer service connection option (i.e., a customer service graphical interface) to connect to a customer service center. When the user selects the customer service connection option, the RP 100 creates a connection to the customer service center, and performs the connection according to the customer service center connection data 175 (see FIG. 2).

Figure 7:
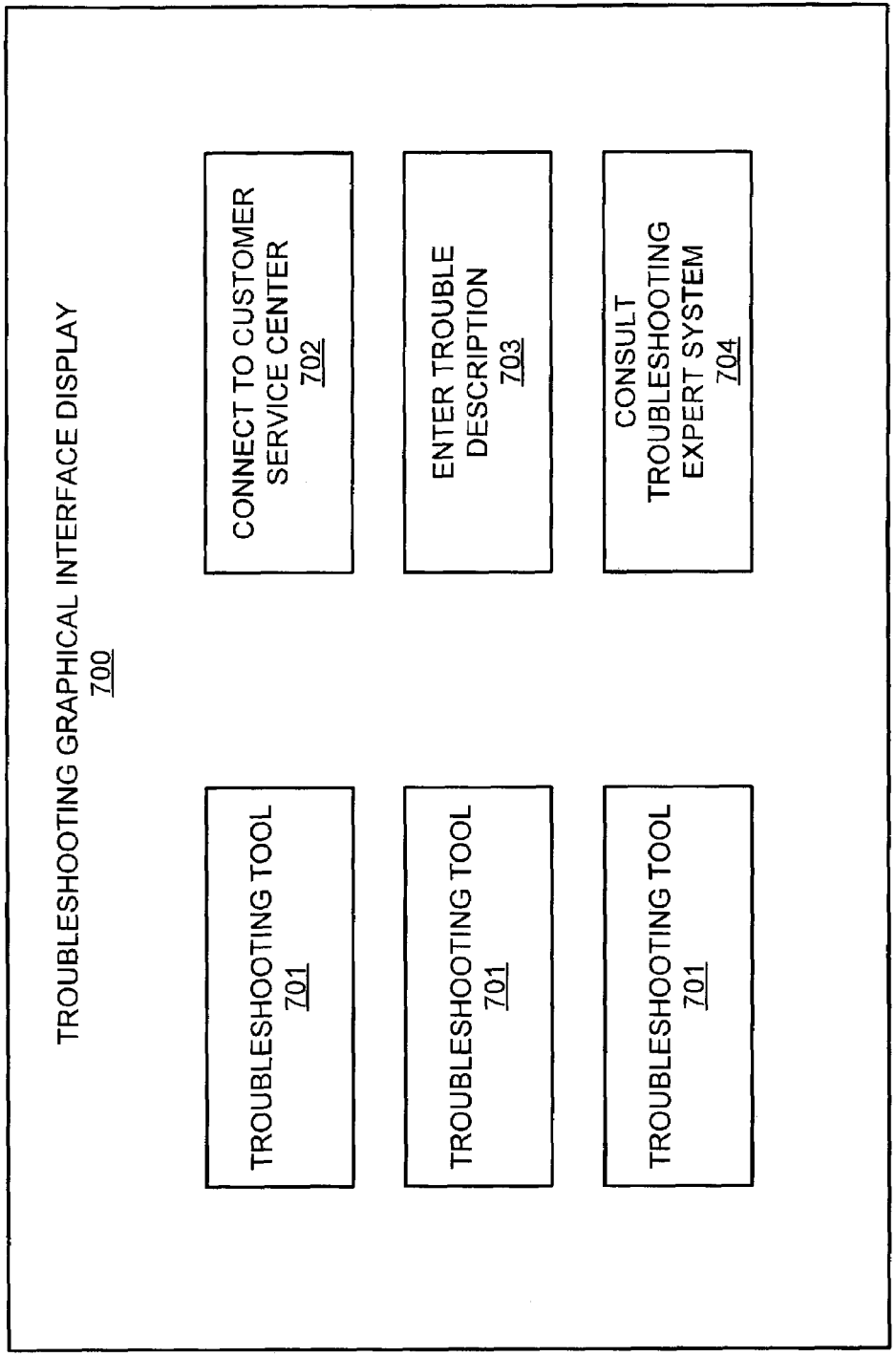
FIG. 7 shows a troubleshooting graphical interface display according to another embodiment of the invention.

FIG. 7 shows a troubleshooting graphical interface display 700 according to another embodiment of the invention. The display 700 in one example is generated on a computer monitor or other computer visual output device, such as a display component of the processing system 120 (see FIG. 1). The display 700 displays graphical tools and actions, such as through graphical buttons, menus, icons, checkboxes, etc. The figure shows only buttons, for the purpose of clarity. The troubleshooting graphical interface display 700 in the example shown includes three "troubleshooting tool" buttons 701 that perform diagnostic and/or corrective troubleshooting actions, a "connect to customer service center" button 702, an "enter trouble description" button 703, and a "consult troubleshooting expert system" button 704. It should be understood that the button labels given above are merely illustrative. Any combination and/or arrangement of troubleshooting tools and actions may be presented on the display 700. In addition, the components of the display 700 can include other wordings or labels. When the user desires to perform a troubleshooting operation, the user manipulates an appropriate button in order to initiate the corresponding operation. For example, the user can manipulate the "consult troubleshooting expert system" button 704 in order to initiate the expert system and receive troubleshooting instructions and advice.

The troubleshooting interface according to the invention may be employed in a telecommunications system that uses a remote processor (RP) and that allows users to route their own calls. The troubleshooting interface differs from the prior art in that the prior art the toll-free service client must deal exclusively with a customer service center when routing and/or RP problems are encountered. Under the prior art, the user had to request assistance from support specialists who performed the troubleshooting operations, with the troubleshooting operations ranging from simple, repetitive operations (such as rebooting RP components), to complex troubleshooting operations requiring specialized training and knowledge. In contrast, the invention allows the user to perform many simple and frequently used troubleshooting operations. The invention advantageously allows the user a limited access to the RP and that further allows the user to request a session with customer service center personnel if the problem cannot be fixed using the client troubleshooting interface.

The troubleshooting interface according to the invention provides several benefits. The invention automates the troubleshooting process for an RP. The invention allows inexperienced and untrained users to perform troubleshooting operations. The invention enables users to perform their own troubleshooting, and to perform the troubleshooting immediately and on their own timetable. The invention relieves a customer support organization of low-level troubleshooting, and enables users to escalate a troubleshooting process if the automated troubleshooting features do not solve the particular problem.

What is claimed is:

1. A remote processor (RP) adapted for use with a telephone system and coupled to a call center, comprising:
   a communication interface configured to communicate with a service control point (SCP) of said telephone system;
   a processing system configured to present a troubleshooting graphical interface to the call center and present one or more troubleshooting tools to be used in troubleshooting RP operations and in troubleshooting RP interactions with said telephone system.

2. The RP of claim 1, further comprising a storage system storing;
   a troubleshooting graphical interface routine that presents said troubleshooting graphical interface; and
   one or more troubleshooting actions that present said one or more troubleshooting tools, with a troubleshooting operation corresponding to a troubleshooting tool capable of being selected by a user and performed by said troubleshooting graphical interface routine.

3. The RP of claim 1, wherein said troubleshooting graphical interface receives user inputs from a user interface and performs one or more troubleshooting actions corresponding to said one or more troubleshooting tools.

4. The RP of claim 1, further comprising a storage system storing a client registry of users authorized to use said troubleshooting graphical interface.

5. The RP of claim 1, further comprising a storage system storing a customer service center connection data, wherein said customer service center connection data is used by said RP to establish a connection to a customer service center.

6. The RP of claim 1, further comprising a storage system storing a troubleshooting expert system that presents symptoms and suggested troubleshooting actions to a user.

7. The RP of claim 1, further comprising a storage system including a client trouble description storage that stores trouble descriptions entered by a user, with said client trouble description configured to provide said trouble descriptions to a customer service center when said RP is connected to said customer service center.

8. The RP of claim 1, wherein said RP is a component of a toll-free service client call center.

9. The RP of claim 1, wherein said RP is remote from a toll-free service client call center.

10. A client troubleshooting method in a remote processor (RP) of a telephone system, comprising the steps of:
    presenting a troubleshooting graphical interface to a user in a call center; and
    presenting one or more predetermined troubleshooting tools to the user in the call center to be used in troubleshooting RP operations and in troubleshooting RP interactions with a service control point (SCP) in said telephone system.

11. The method of claim 10, further comprising the steps of;
    accepting user inputs in said troubleshooting graphical interface; and
    performing one or more troubleshooting actions corresponding to said one or more predetermined troubleshooting tools.

12. The method of claim 10, further comprising the step of presenting a customer service connection, wherein a connection to a customer service center is established when said customer service connection is selected.

13. The method of claim 10, further comprising the step of maintaining a client registry of users authorized to use said troubleshooting graphical interface.

14. The method of claim 10, further comprising the step of presenting a troubleshooting expert system that presents symptoms and suggested troubleshooting actions to a user.

15. The method of claim 10, further comprising the step of maintaining a client trouble description storage that stores trouble descriptions entered by a user.

16. A software product for a remote processor (RP) of a telephone system coupled to a call center, said software product, comprising:
   control software configured when executed by a processing system to direct said processing system to present a troubleshooting graphical interface to a user of the call center and present one or more troubleshooting tools to be used in troubleshooting RP operations and in troubleshooting RP interactions with a service control point (SCP) in said telephone system; and
   a storage system that stores the control software.

17. The software product of claim 16, wherein said control software further directs said processing system to present a customer service center connection, wherein a connection to a customer service center is established when said customer service connection is selected.

18. The software product of claim 16, wherein said control software further directs said processing system to maintain a client registry of users authorized to use said troubleshooting graphical interface.

19. The software product of claim 16, wherein said control software further directs said processing system to present a troubleshooting expert system that presents symptoms and suggested troubleshooting actions to a user.

20. The software product of claim 16, wherein said control software further directs said processing system to maintain a client trouble description storage that stores trouble descriptions entered by a user.

* * * * *